United States Patent
Greenwell

(10) Patent No.: US 6,853,887 B1
(45) Date of Patent: Feb. 8, 2005

(54) WIRELESS BACKUP COMMUNICATION LINK FOR VEHICLE CONTROL

(75) Inventor: Randall G. Greenwell, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/662,548

(22) Filed: Sep. 15, 2003

(51) Int. Cl.[7] ............................. G05D 1/00; G05D 3/00
(52) U.S. Cl. ............................................... 701/1; 701/23
(58) Field of Search ......................... 701/1, 2, 23, 24, 701/34

(56) References Cited

U.S. PATENT DOCUMENTS 6,721,638 B2 * 4/2004 Zeitler ........................ 701/23
6,772,062 B2 * 8/2004 Lasky et al. ................. 701/207

* cited by examiner

Primary Examiner—Yonel Beaulieu
(74) Attorney, Agent, or Firm—Christopher DeVries

(57) ABSTRACT

Methods and apparatus are provided for controlling drive-by-wire vehicle operation using redundant wireline and wireless communication links. Outputs received from a driver controlled vehicle feature are interpreted by a functional control module and converted to actuator commands to be transmitted over either the wireline or wireless communication link to an actuator to execute the driver desired maneuver or vehicle function (e.g., steering, braking, lights, etc.). A communication controller periodically tests the communication links to determine which are operative. Under normal conditions the commands are transmitted over the wireline communication link. If the wireline communication link fails the commands are automatically switched to the wireless communication link. If both links fail, a failsafe strategy is initiated.

18 Claims, 8 Drawing Sheets

WIRELESS BACKUP COMMUNICATION LINK FOR VEHICLE CONTROL

TECHNICAL FIELD

The present invention generally relates to a control system, and more particularly to backup communication for a vehicle drive-by-wire system, and even more particularly to backup communication an automobile drive-by-wire system.

BACKGROUND

Automobiles have many different functions controlled by the operator. For example, the operator controls the engine, transmission, transfer case, steering, braking, lighting, doors and door locks, sound systems, wipers, heaters. Previously, such automobile functions were few and fairly simple devices coupled to the operator with various mechanical linkages. Subsequently, hydraulic systems and electrical systems were developed and replaced many of the earlier mechanical linkages or made it possible to include new functions that did not have mechanical equivalents.

Currently, many functions are electronic and permit further improvement in various automobile functions and subsystems. For example, brakes were originally mechanical and actuated by cables and wires coupled between the brake pedal and brake shoes. Hydraulic brakes replaced the mechanical brakes and electronically controlled brakes replaced the hydraulic brakes and provide numerous capabilities that did not previously exist, such as antilock braking capability and independent braking at each wheel.

Many other automobile control functions are also being converted from mechanical or hydraulically controlled functions to electronically controlled functions. These electronically controlled functions are referred to generally as drive-by-wire systems as the automobile control functions previously having direct mechanical or hydraulic linkage between the operator and n actuator (e.g., brakes, engine, transmission, lights, etc.) no longer exist or have only an auxiliary role and the operator exerts control over the particular function through an electronic controller. The electronic controller receives operator commands (e.g., turn left/right; speed up/slow down; apply/release brakes; lights on/off; etc.), translates the operator commands into electrical signals and sends the electrical signals to the appropriate actuator (e.g., steering motor; throttle actuator; brake actuator; light control module; etc.). The electronic controller may also make a variety decisions, including decisions to adjust one or more actuators to improve operational performance. Antilock brakes are a well known example of a drive-by-wire function that makes decisions that improve operational performance of the automobile.

In addition to improving operational performance of automobiles, drive-by-wire systems are continuously sought that have improved reliability. Since automobile drive-by-wire systems rely on electronic communication between control modules and actuators, the drive-by-wire systems are susceptible to interruptions in communication channels, which can be caused by any number of factors or events and ultimately reduce reliability. Thus, automobile drive-by-wired systems are continually sought that address the susceptibility to communication interruptions.

Accordingly, it is desirable to provide improved drive-by-wire systems for automobiles. It is especially desirable to provide automobile drive-by-wire systems having redundant electronic communication paths that minimize effects caused by interruptions in communication channels. Furthermore, other desirable features and characteristics of the present invention will become apparent from the subsequent detailed description and the appended claims, taken in conjunction with the accompanying drawings and the foregoing technical field and background.

BRIEF SUMMARY

An automobile drive-by-wire system, such as an automobile drive-by-wire system, is provided in accordance with an exemplary embodiment of the present invention that includes a sensor that is configured to generate an output indicative of a driver requested setting of a first drive-by-wire function and a function control module coupled to the sensor and providing an actuator command based at least in part on the output of the sensor. In addition, the automobile drive-by-wire system includes a wireline communication link coupled to the function control module and configured to receive and transmit the actuator command and a wireless communication link coupled to the function control module and configured to receive and transmit the actuator command. Furthermore, the automobile drive-by-wire system includes a communication control unit coupled to the wireline communication link and the wireless communication link and an actuator coupled to the wireline communication link and the wireless communication link. The communication control unit is configured to identify a failure of the wireline communication link to transmit the actuator command and further configured to redirect transmission of the actuator command over the wireless communication link. The actuator is configured to receive the actuator command from the wireless communication link unless the failure of the wireless communication link to transmit the actuator command exists.

A method of operating an automobile drive-by-wire system, such as an automobile drive-by-wire system, is provided in accordance with an exemplary embodiment of the present invention. The method includes generating an output indicative of a driver requested setting of a first drive-by-wire function, providing an actuator command based at least in part on the output and testing a wireline communication link that is configured to transmit the actuator command to an actuator. In addition, the method includes enabling a wireless communication link to transmit the actuator command to the actuator if the testing of the wireline communication link indicates a failure in the wireline communication link.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As used herein in connection with the present invention, the "wire", "bus", and "wireline", whether singular or plural, shall refer to electrical or electronic signal paths where the signals propagate in a solid filament or cable of some sort. Non-limiting examples are conductive wires, fiber optic links and combinations thereof. In addition, as used herein, the words "wireless," "wireless communication links," and "radio" shall refer to signal communication propagating without use of such solid filament or cable. Furthermore, as used herein, "drive-by-wire" shall refer to systems providing particular driver controlled functions by means of electronic communication between two or more of a sensor, control module and/or an actuator, no matter whether the communication is carried by a wireline communication link or a wireless communication link Referring to FIG. 1, a simplified electrical schematic diagram of automobile drive-by-wire system 10 is illustrated in accordance with an exemplary embodiment of the present invention. While the present invention is particularly directed to a drive-by-wire system for an automobile, the present invention is applicable to any number of land, water, air or space automobiles. The drive-by-wire system 10 comprises sensor equipped driver controls 12 such as a steering position sensor 14, brake pedal sensor 16 and other sensors for other automobile control functions, which are collectively represented collectively by "sensor N" 16. As can be appreciated by those of ordinary skill in the art, any number of automobile control functions and corresponding sensors can be included in sensor equipped driver controls 12.

Figure 1:
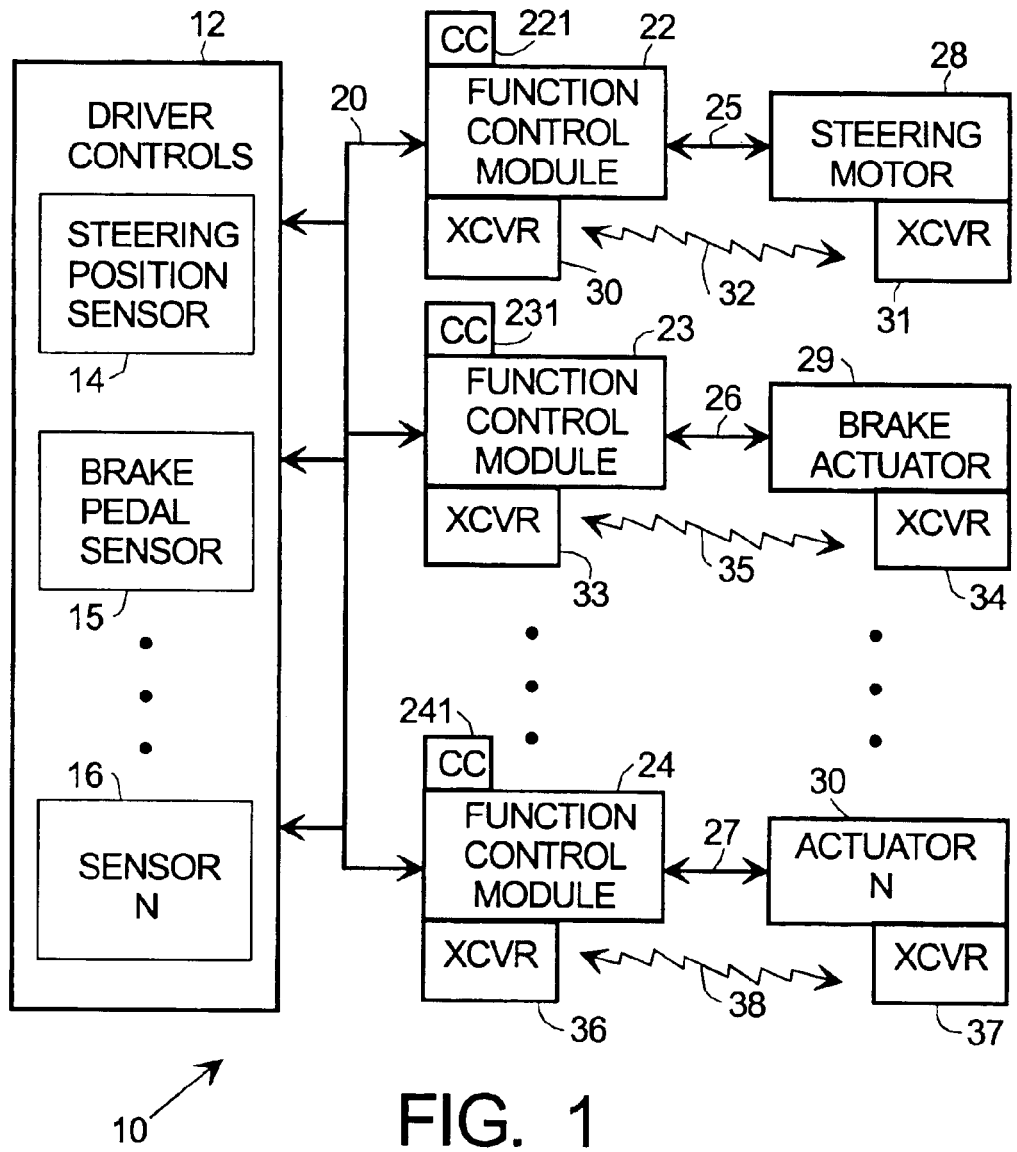
FIG. 1 is a simplified electrical schematic diagram of an automobile drive-by-wire system according to an exemplary embodiment of the present invention.

As the automobile operator utilizes the various controls included in the sensor equipped driver controls, electrical signals indicative of the changes measured by various control function sensors (14,15,16) are sent via bus or wireline communication link 20 to function control modules (22,23, 24). In this example, each function sensor (14,15,16) of the sensor equipped driver controls 12 is provided with a corresponding function control module (22,23,24). Function control modules (22,23,24) are coupled via wireline communication links (25,26,27) to respective actuators (28,29, 30). While only three drive-by-wire functions are illustrated in FIG. 1 and other figures subsequently described in this detailed description, more than three and less than three drive-by-wire functions can be incorporated the automobile drive-by-wire system 10.

As an example, as the operator or driver of the automobile turns the steering wheel, steering position sensor 14 measures the change in orientation and transmits this information via wireline communication link 20 to control module 22. Control module 22 interprets the sensor information and determines the appropriate command to send to steering motor 28 via wireline communication link 25 to affect the change requested by the automobile operator. Other drive-by-wire functions, such as a braking function, operate in a similar manner with the appropriate signaling protocols and it will also be understood that function control modules (22,23,24) will differ as needed to control the respective actuators (28,29,30).

In most cases, sensor equipped driver controls 12 and function control modules (22,23,24), which are coupled by bus 20, are physically in close proximity and can also be integrated into a single unit or a relatively small number of coupled units. In contrast, function control modules (22,23, 24) and actuators (28,29,30), which are coupled by wireline communication links (25,26,27) are typically not in close proximity. Thus, wireline communication links (25,26,27) are susceptible to communication interruptions or failures and redundancy or back-up communication for the wireline communication links (25,26,27) are desirable. Transceiver (XCVR) pairs (30,31;33,34;36,37) provide parallel communication paths with wireline communication links (25,26, 27). When one of the wireline communication links (25,26, 27) fails, as determined by Communication Controllers (CCs) (221,231,241), the corresponding transceiver (XCVR) pair (30,31;33,34;36-37) takes over the drive-by-wire communication function previously performed by the corresponding wireline communication link. In the preferred embodiment, only a failed wireline communication link is replaced by a corresponding wireless communication link. As is explained more fully in connection with FIG. 4, FIG. 5, FIG. 6 and FIG. 7, the CC (221,231,241) transmits test signals over wireline communication links (20,25,26,27) and wireless communication links (32,35,38) to verify that the links are operating properly and for any wireline communication link that has failed, transfer the transmission function to the corresponding wireless communication link.

For example, CC 221 executes a periodic continuity check as subsequently described in this detailed description in connection with FIG. 4, FIG. 5, FIG. 6 and FIG. 7. As long as wireline communication link 25 is operating normally, the wireline communication link is used for communication of steering commands of the automobile steering function. While the wireline communication link is preferably the default communication link, the wireless communication link 32 is used for communication of steering commands if the CC unit 221 detects that link 25 has failed, function control module 22 is notified and switches steering command communication to steering motor 28 via XCVRs (30,31) over wireless communication link 32. Actuator 28 receives the control signals from XCVR 31 and performs the desired function with minimal or no interruption. Depending upon the automobile function, actuator 28 can send any number of acknowledgements or other response signals to controller 22 via XCVRs (31,30). While wireless communication transceivers (30,31,33,34,36,37) and communication paths (32,35,38) are shown in FIG. 1 as providing two-way communication, this is merely for convenience of description and not intended to be limiting. Wireless communication can be two-way or one-way depending upon the technical requirements of the automobile function.

The communication controller function can be integrated into driver controls 12 or provided in function control modules (22,23,24) as illustratively shown in FIG. 1 or provided independently and coupled with an appropriate wireline and/or wireless communication link. Either arrangement is useful, but it is preferred in the arrangement of FIG. 1 to have CCs (221,231,241) integrated or coupled to the respective function control modules (22,23,24). Persons of ordinary skill in the art will understand the appropriate arrangement depending upon the needs of the particular automobile configuration and type. CCs (231,241) and associated transceiver pairs (33,34;36,37) perform equivalent communication back-up functions between function control module 23 and brake actuator 29 over wireless communication link 35 and between function control module 24 and actuator N 30 over wireless communication link 38, respectively. Persons of ordinary skill in the art will understand that XCVR pairs (30,31;33,34;36-37) may operate in different manners and employ different signaling frequencies and/or data communication protocols so as to best serve the communication functions required by the respective controller-actuator pairs and minimize interference among wireless signals (32,35,38).

Figure 2:
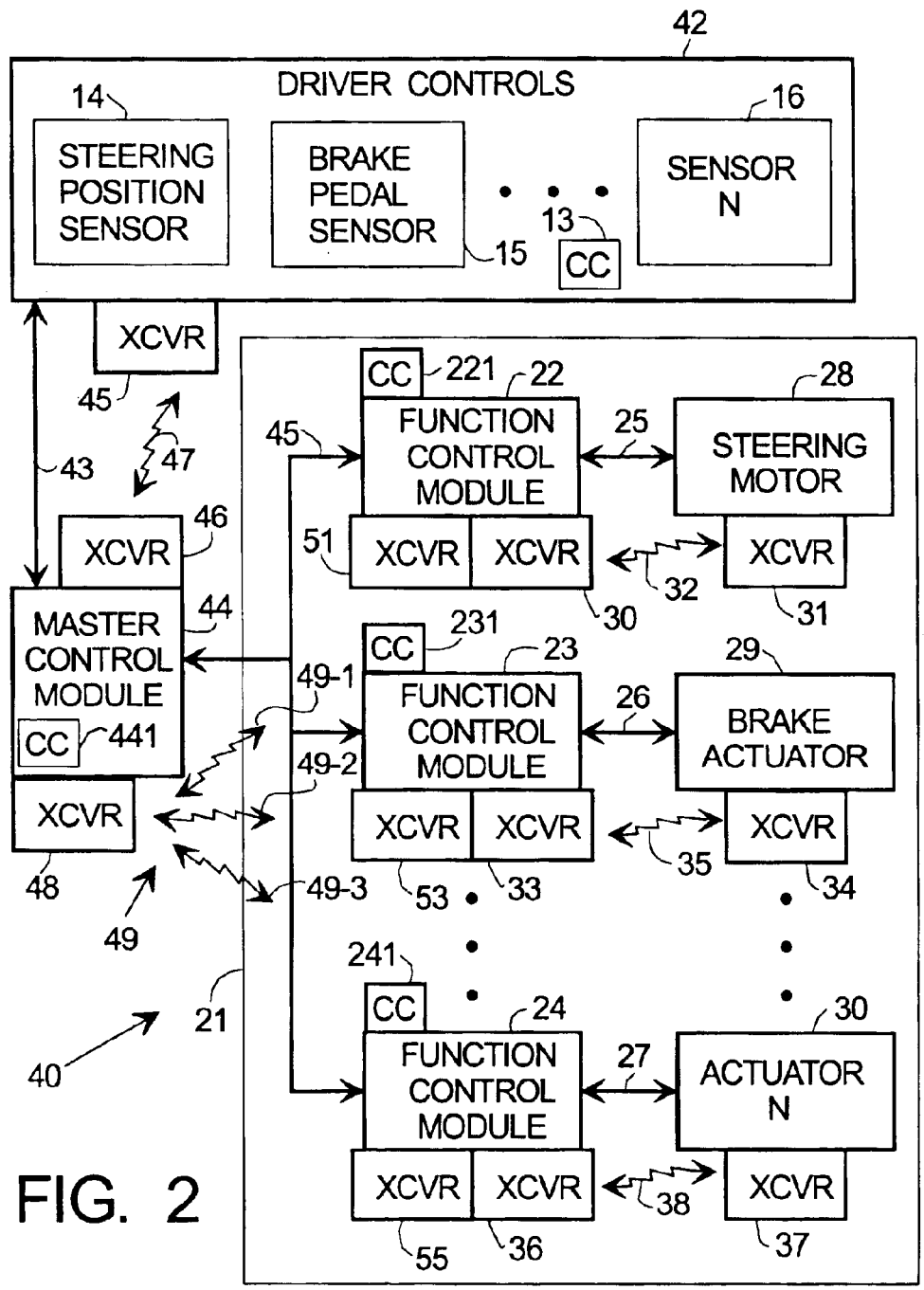
FIG. 2 is a simplified electrical schematic diagram of an automobile drive-by-wire system according to another exemplary embodiment of the present invention.

FIG. 2 is a simplified electrical schematic diagram of automobile drive-by-wire system 40 according to a further exemplary embodiment of the present invention. In the automobile driver-by-wire system 40, the elements enclosed in the outline 21 are analogous to like-numbered elements of the automobile drive-by-wire system 10 of FIG. 1. The automobile drive-by-wire system 40 has driver controls 42 analogous to driver controls 12 of the automobile drive-by-wire system 10 of FIG. 1, with steering position sensor 14, brake pedal sensor 15 and sensor N 16 performing substantially the same functions as previously described in this detailed description. CC 13 is desirably, but not essentially, included within driver controls 42 to control the communication pathway between driver controls 42 and master control module 44. CC unit 13 provides periodic continuity checks to verify whether the wireline communication link 43 and/or the wireless communication link 47 are operating properly and assign communication between driver controls 42 and master control module 44 to the communication link that is operating properly. This is explained more fully in connection with FIG. 4, FIG. 5, FIG. 6 and FIG. 7.

The master control module 44 is configured to receive sensor output from driver controls 12 via wireline communication link 43 or wireless communication link 47 and encodes the output for further transmission to individual function control modules (22,23,24) via wireline communication link 45 or wireless communication links 49. Function control modules (22,23,24) subsequently transmit the appropriate commands signals over wireline communication links (25,26,27) or wireless communication links (32,35,38) to actuators (28,29,30), respectively, as previously described in this detailed description. Master control module 44 conveniently serves as a protocol or signal translator to convert the output into a form interpretable by function control modules (22,23,24). This arrangement is convenient, but not essential, since the function of the master control module 44 can be upward integrated into driver controls 42, as was also assumed in the automobile drive-by-wire system 10 of FIG. 1. This configuration may be desirable to partition the sensor and signal conversion functions into physically separate units, thus requiring use of coupling wireline communication link 43 or wireless communication link 47. Master control module 44 conveniently, but not essentially, includes CC 441 for managing downstream communication links (45,49). CC 441 provides periodic continuity checks to verify whether wireline communication link 45 and/or wireless communication link 49 are operating and assign communication between control module 44 and function control modules 22, 23, 24 to the working link or working links (e.g., wireline communication link 45 or wireless communication links (49-1,49-2,49-3, etc.) as explained more fully in connection with FIG. 4, FIG. 5, FIG. 6 and FIG. 7.

The automobile drive-by-wire system 40 includes multiple wireline communication links (25,26,27,43,45). The automobile drive-by-wire system 10 of FIG. 1 and the automobile drive-by-wire system 40 of FIG. 2 preferably use wireless transceiver pairs (30,31;33-34;36-37) to provide backup communication links (32,35,38) for wireline communication links (25,26,27). In the drive-by-wire system 40 of FIG. 2, additional back-up wireless communication links are provided for wireline communication links (43,45). XCVR pair (45,46) is configured as the backup wireless communication link 47 for wireline communication link 43 between driver controls 42 and master control module 44. XCVR 48 provides backup wireless communication links 49 (e.g., 49-1, 49-2, 49-3, etc.) for wireline communication link 45 between master control module 44 and control modules (22,23,24). XCVRs (51,53,55) of function control modules (22,23,24), respectively, communicate with XCVR 48 via wireless communication links (49-1,49-2,49-3) respectively, depending upon which of wireline communication links (25,26,27) has failed to provide a proper communication path. Persons of skill in the art will understand based on this detailed description that wireless signals (49-1,49-2,49-3) between XCVR 48 and individual XCVRs (51,53,55) can differ according to the address and/or signaling protocols used by the different function controllers. Also, it will be understood that the functions provided by XCVRs (46,48) can be combined in a single unit responsive to wireless signals (47,49). Similarly, XCVRs (51, 30;53,33;55,36) can be combined into units responsive to wireless signals (49-1,32;49-2,35;49-3,38) for their particular function control modules. CCs (221,231,241) conveniently perform the same functions as described in connection with automobile drive-by-wire system 10 of FIG. 1 to manage the communication links between function control modules (22,23,24) and the respective actuators (28,29,30).

Figure 3:
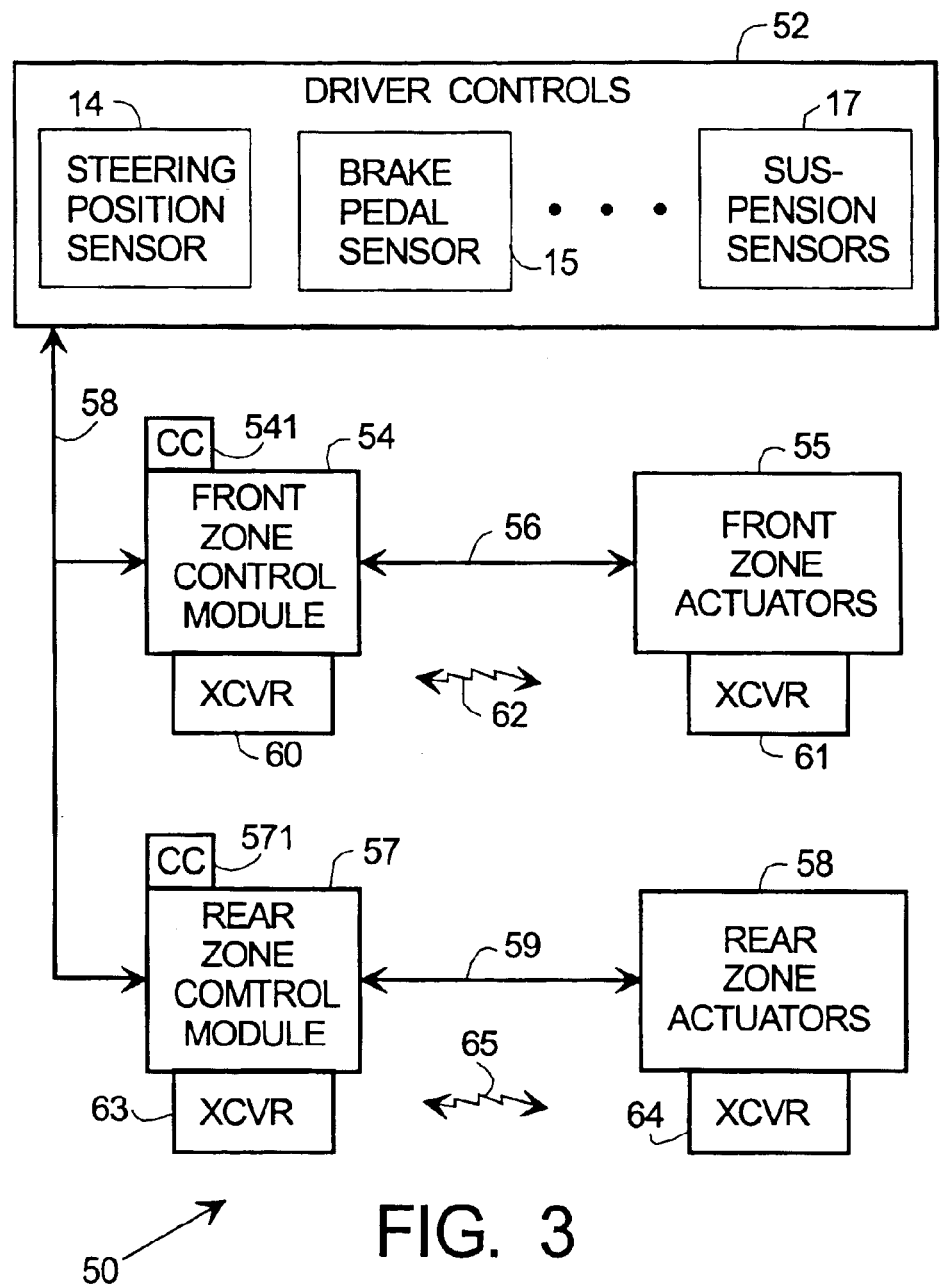
FIG. 3 is a simplified electrical schematic diagram of an automobile drive-by-wire system according to yet another exemplary embodiment of the present invention.

FIG. 3 is a simplified electrical schematic diagram of a drive-by-wire system 50 according to another exemplary embodiment of the present invention. The drive-by-wire system 50 includes driver controls 52 analogous to driver controls (12, 42) of FIG. 1 and FIG. 1. However, the sensor N is identified as suspension sensors 17 in the drive-by-wire system 50 of FIG. 3 which are well known to those of ordinary skill in the art. The automobile drive-by-wire system 50 differs from the automobile drive-by-wire system 10 of FIG. 1 and the automobile drive-by-wire system 40 of FIG. 2 in that function controllers (54,57) relate to specific zones of the automobile (e.g., front, back, side, bottom, top etc.) rather than individual control functions (e.g., steering, brakes, etc.) as in FIG. 1 and FIG. 2. Front zone control module 54 and rear zone control module 57 are coupled to driver controls 52 by wireline communication link 58. CCs (541,571) are provided in control modules (54,57), respectively, to manage downstream communications to the respective actuators. Front zone control module 54 is coupled to front zone actuators 55 by wireline communication link 56 or wireless communication link 62 and rear zone control module 57 is coupled to rear zone actuators 58 by wireline communication link 59 or wireless communication link 65.

Front zone controller 54 conveniently receives information relating to multiple drive-by-wire functions for the front of the automobile from driver controls 52. For example, controller 54 receives information indicative of the operator desired front wheel steering, front wheel braking, front suspension properties, front light status, and so forth. Rear zone controller 57 receives information indicative of the operator desired rear wheel steering, rear wheel braking, rear suspension properties, rear light status, and so forth. Corresponding front and rear zone actuators (55,58) include actuators for the functions in that zone and the actuators respond to individual commands sent along wireline communication links (56,59) or wireless communication links (62,65), respectively. Persons of ordinary skill in the art will understand that by using an appropriate addressing or signal ID arrangement, the different actuators in the zones can distinguish between the commands and respond accordingly. Zone controllers are especially useful in reducing the number of individual communication links needed between centrally located controllers and remotely located actuators.

In the drive-by-wire system 50 of FIG. 3, XCVR pair (60,61) are managed by CC 541 and provide backup wireless communication link 62 that replaces wireline communication link 56 when wireline communication link 56 fails. Similarly, XCVR pair (63,64), which is managed by CC 571, provides backup wireless communication link 65 that replaces wireline communication link 59 when wireline communication link 59 fails. CCs (541,571) provide periodic continuity checks to determine whether wireline communication links (56,59) and/or wireless communication links (62,65) are functioning and direct control modules (54,57) to the functioning communication link is functioning. When both wireline communication link and wireless communication link are functioning, it is preferred, but not essential, to use the wireline communication link. Therefore, the wireline communication link(s) is preferably, but not essentially, the default links. In this preferred exemplary embodiment, XCVR 60 receives substantially the same signals from control module 54 that module 54 would have transmitted along wireline communication link 56 and couples the XCVR 60 and the control module 54 via wireless communication link 62 to corresponding XCVR 61 which in turn passes the signals to actuators 55 in the same manner as if the signals had been received from wireline communication link 56. Return signals and/or command acknowledgements are passed back from actuators 55 to control module 54 via XCVR pair (61,60) over wireless communication link 62. XCVRs (63,64) and wireless communication link 65 function in an equivalent manner under the direction of CC 571 to replace the failed wireline communication link 59. Persons of ordinary skill in the art will understand how to configure the CCs and the individual transceivers described herein.

Figure 4A:
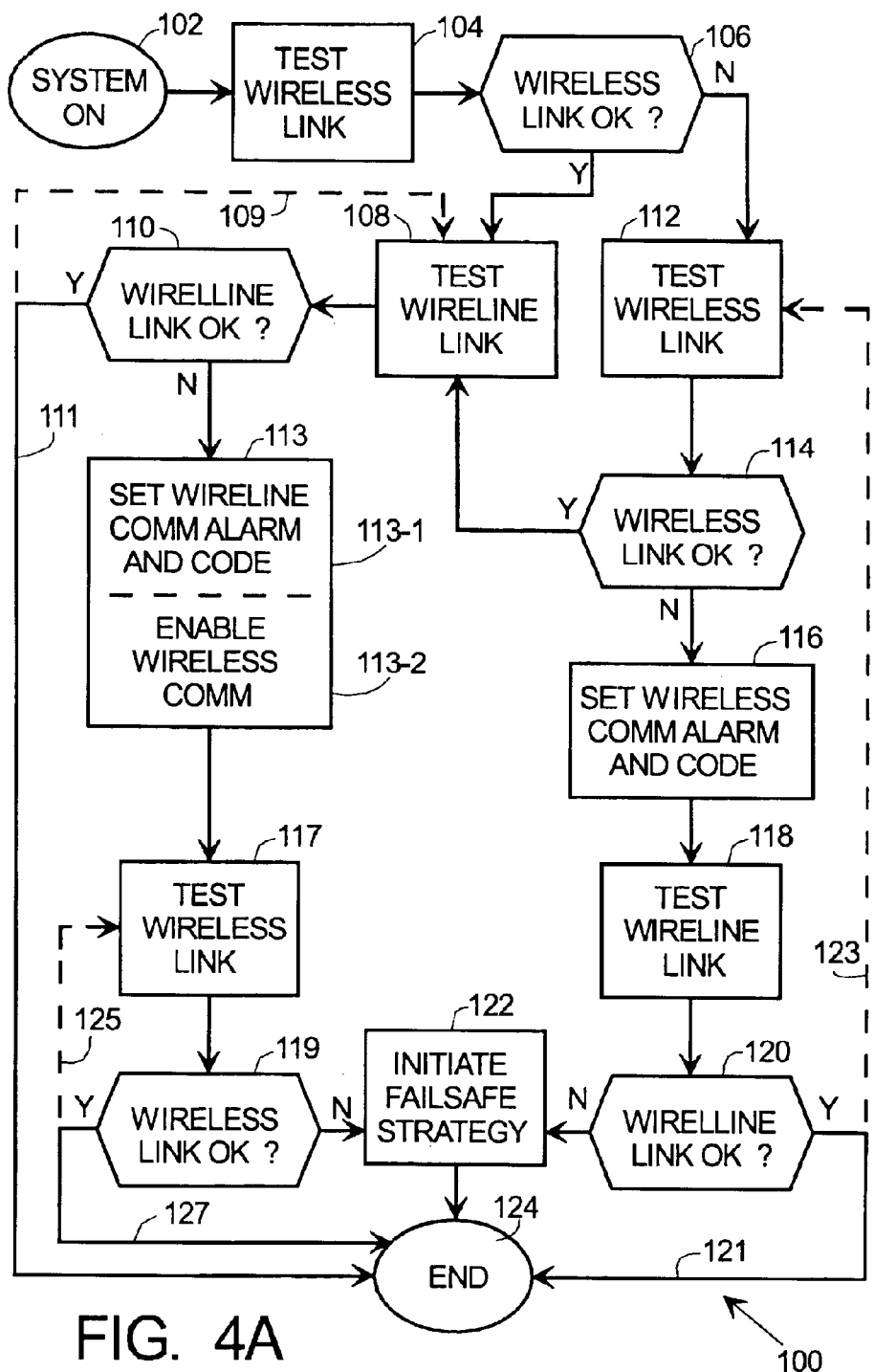
FIGS. 4A–4B are simplified flow charts illustrating a method of operating an automobile drive-by-wire system in accordance with an exemplary embodiment of the present invention.
Figure 4B:
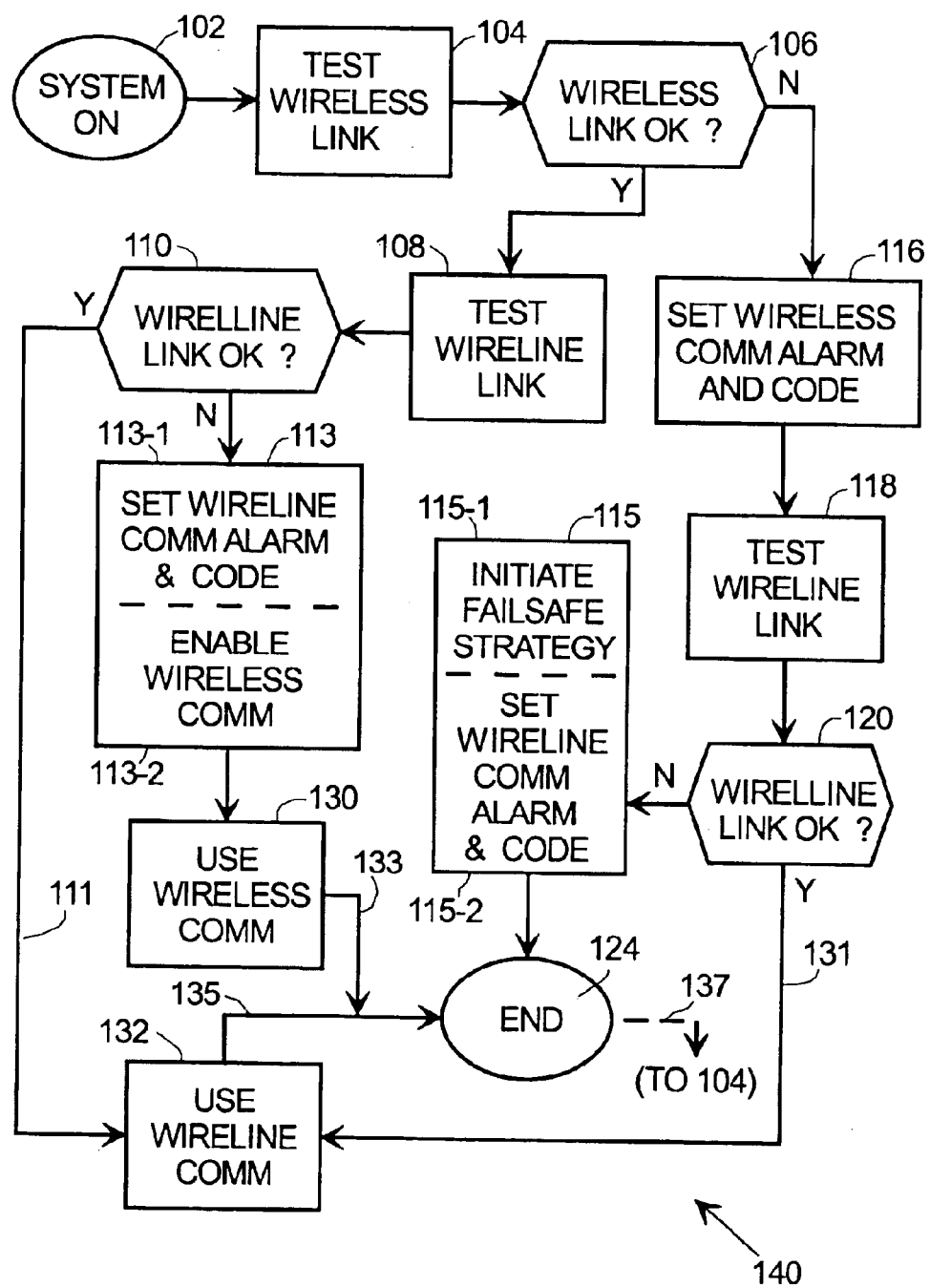

FIG. 4A is a simplified flow chart illustrating the method 100 of operating an automobile drive-by-wired system according to an exemplary embodiment and FIG. 4B is a simplified flowchart illustrating the method 140 of operating an automobile drive-by-wire system according to another exemplary embodiment, and like reference numbers are used for like steps in these two methods (100,140). The purpose of the methods (100,140) is to determine whether or not any of the wireline communication links previously illustrated and described have failed and if such a failure is identified, switch control of the communication path(s) to the wireless communication links operating in parallel with the wireline communication links. The methods (100,140) and subsequently described methods are preferably performed by the CCs associated with the communication links having backup wireless communication links. In the preferred exemplary embodiment, the automobile drive-by-wire systems (10,40,50) and methods (100,140) are arranged so that drive-by-wire communication uses the wireline communication links unless a particular wireline communication link is faulty, whereupon the associated CC unit causes communication for that wireline communication link to be switched to the wireless communication link operating in parallel. The default drive-by-wire communication is preferably by wireline communication link(s) and the parallel wireless communication link(s) operating in parallel and the wireless communication link(s) assumes the communication responsibilities only when the corresponding wireline communication link portion fails. When a particular wireline communication link and associated wireless communication link both fail, then a failsafe strategy is invoked. In FIG. 4, FIG. 5, FIG. 6 and FIG. 7 as subsequently described in this detailed description, the abbreviation "Y" is used to indicate a YES (e.g., TRUE) outcome to a query and the abbreviation "N" is used to indicate a NO (e.g., FALSE) outcome to a query. While the methods illustrated in FIG. 4, FIG. 5, FIG. 6 and FIG. 7 are conveniently executed using the appropriate CCs previously described in this detailed description, this is not essential. As can be appreciated by those of ordinary skill in the art, virtually all modern automobiles incorporating drive-by-wire functions include a micro-processor or micro-controller able to execute the methods illustrated in FIG. 4, FIG. 5, FIG. 6 and FIG. 7 to control the appropriate communication functions within the drive-by-wire system. Persons of ordinary skill in the art will understand how to program a micro-controller or microprocessor to perform the methods illustrated in FIG. 4, FIG. 5, FIG. 6 and FIG. 7.

Referring now to method 100 shown in FIG. 4A, when the automobile is turned on as indicated by SYSTEM ON block 102 (e.g., door opened, key inserted in a lock, ignition engaged, etc.), TEST WIRELESS COMMUNICATION LINK step 104 is executed resulting in WIRELESS COMMUNICATION LINK OK? query 106. If the outcome of query 106 is YES (e.g., TRUE) then method 100 proceeds to TEST WIRELINE COMMUNICATION LINK step 108 resulting in WIRELINE COMMUNICATION LINK OK? query 110. If the outcome of query 110 is YES (e.g., TRUE), then the wireline communication link is functioning normally and method 100 preferably proceeds via path 111 to END 124. Alternatively, where it is desired to repeatedly verify that the wireline communication link is functioning without repeating initial steps 104-106, method 100 can loop directly back to TEST WIRELINE COMMUNICATION LINK step 108 as shown by path 109. If the outcome of query 106 is NO (e.g., FALSE) then method 100 conveniently retests the wireless communication link in TEST WIRELESS COMMUNICATION LINK step 112 leading to WIRELESS COMMUNICATION LINK OK? query 114. If the outcome of query 114 is YES (e.g., TRUE) then method 100 loops back to TEST WIRELINE COMMUNICATION LINK step 108 as previously described in this description of the method 100.

Returning now to query 114, if the outcome of query 114 is NO (e.g., FALSE) then method 100 proceeds to SET WIRELESS COMM ALARM AND CODE step 116 wherein: (i) an alarm is activated that is apparent to the automobile operator. For example, a tell-tale "check XX" light or other warning, where XX is the particular drive-by-wire function that has a failed wireless communication link, and (ii) a flag or code is set indicating that the wireless communication link being tested is not operating properly (e.g., a flag or code is set in the memory of the corresponding automobile controller or the particular function controller or router or elsewhere in the automobile electronic system). Following step 116, method 100 desirably proceeds to TEST WIRELINE COMMUNICATION LINK step 118 where the corresponding wireline communication link is tested, leading to WIRELINE COMMUNICATION LINK OK? query 120. If the outcome of query 120 is YES (e.g., TRUE), verifying that the corresponding wireline communication link is functioning properly, then method 100 preferably proceeds to end 124 via path 121. Alternatively, where it is desired to retest the failed wireless communication link without repeating steps 104-106, control can be returned to TEST WIRELESS COMMUNICATION LINK step 112 as shown by path 123. If the outcome of query 120 is NO (e.g., FALSE), then method 100 proceeds to INITIATE FAILSAFE STRATEGY step 122. The appropriate failsafe strategy will depend upon which drive-by-wire function has lost communication between the controller and the actuator. Persons of ordinary skill in the art will understand how to choose an appropriate failsafe strategy depending upon the particular automobile function. By way of example, where method 100 is executed before automobile start-up has occurred, then if the failed drive-by-wire function is a safety critical function, an appropriate failsafe strategy might be to prevent the automobile from starting. However, such a decision is dependent upon the particular automobile and particular function concerned and is generally up to the automobile designer.

Returning now to WIRELINE COMMUNICATION LINK OK? query 110, if the outcome of query 110 is NO (e.g., FALSE), indicating that a particular wireline communication link has failed, then method 100 proceeds to step 113 wherein SET WIRELINE COMM ALARM AND CODE step 113-1 and ENABLE WIRELESS COMM step 113-2 are executed in either order. In SET WIRELINE COMM ALARM AND CODE step 113-1, an alarm is activated that is apparent to the automobile operator. For example, a tell-tale "check XX" light or other warning can be activated, where XX is the particular drive-by-wire function whose wireline communication link has failed, and/or a flag or code is set (e.g., a flag or code is set in a memory of the corresponding automobile controller or the particular function controller or router or elsewhere in the automobile electronic system, indicating that the wireline communication link being tested is not operating properly. Steps 113-1 and 113-2 may be performed in either order.

Following step 113, method 100 desirably proceeds to TEST WIRELESS COMMUNICATION LINK step 117 where the corresponding backup wireless communication link is tested, leading to WIRELESS COMMUNICATION LINK OK? query 119. If the outcome of query 119 is YES (e.g., TRUE), that is, the corresponding wireless communication link is functioning properly, then the wireless communication link is used for communication for that function and method 127 proceeds to end 124 via path 127. Alternatively, where it is desired to retest the wireless communication link without repeating steps 104 to 113, control can loop directly back to TEST WIRELESS COMMUNICATION LINK step 117 as shown by path 125. If the outcome of query 119 is NO (e.g., FALSE) then method 100 proceeds to INITIATE FAILSAFE STRATEGY step 122 previously discussed in this detailed description. Persons of ordinary skill in the art will understand how to choose an appropriate failsafe strategy depending upon the automobile function. For convenience of explanation in method 100 of FIG. 4A, when WIRELINE COMMUNICATION LINK OK? queries (110,120) yield YES (e.g., TRUE), then the corresponding wireline communication link is used for communication by default (i.e., a 'USE WIRELINE COMMUNICATION LINK' step is presumed in paths 111 and 121). Similarly, when WIRELESS COMMUNICATION LINK OK? query 119 yields YES (e.g., TRUE), then the corresponding wireless communication link is used for communication (i.e., a 'USE WIRELESS COMMUNICATION LINK' step is presumed in path 127). Method 100 should be repeated as often as needed to insure that reliable communication is maintained in the drive-by-wire system. As persons of ordinary skill in the art will understand, this can be accomplished in many different ways. A non-limiting example is to provide a loop-back (not shown) from END 124 to step 104 so that method 100 runs substantially continuously after SYSTEM ON occurs. Persons of ordinary skill in the art will understand how to choose an arrangement or procedure suitable for their particular application.

Referring now to method 140 shown in FIG. 4B, when the automobile is turned on as indicated by SYSTEM ON block 102 (e.g., door opened, key inserted in a lock, ignition engaged, etc.), TEST WIRELESS COMMUNICATION LINK step 104 is executed resulting in WIRELESS COMMUNICATION LINK OK? query 106. If the outcome of query 106 is YES (e.g., TRUE) then method 140 proceeds to TEST WIRELINE COMMUNICATION LINK step 108 resulting in WIRELINE COMMUNICATION LINK OK? query 110. If the outcome of query 110 is YES (e.g., TRUE), then the wireline communication link is functioning normally and method 140 preferably proceeds via path 111 to END 124 via USE WIRELINE COMM step 132 and path 135.

If the outcome of query 106 is NO (e.g., FALSE) then method 140 conveniently proceeds to SET WIRELESS COMM ALARM AND CODE step 116, then to TEST WIRELINE COMMUNICATION LINK step 118 and corresponding WIRELNE COMMUNICATION LINK OK? query 120. Steps 116, 118 and 120 perform the same functions as already described for like numbered steps in method 100 of FIG. 4A. If the outcome of query 120 is YES (e.g., TRUE), the wireline communication link is functioning properly and method 140 proceeds to end 124 via path 131, USE WIRELINE COMM step 132 and path 135, in the same manners as for the YES (e.g., TRUE) outcome of analogous WIRELINE COMMUNICATION LINK OK? query 110. If the outcome of query 120 is NO (e.g., FALSE) then method 140 proceeds to step 115 where INITIATE FAILSAFE STRATEGY step 115-1 and SET WIRELINE COMM ALARM AND CODE step 115-2 are executed in either order. INITIATE FAILSAFE STRATEGY step 115-1 of method 140 is substantially similar to like-named step 122 of method 100. Similarly, step 115-2 of method 140 is equivalent to step 113-1 of method 100. Following step 115, method 140 proceeds to end 124.

Returning now to query 110 in method 140 of FIG. 4B, if the outcome of query 110 is NO (e.g., FALSE) then method 140 proceeds to step 113, which is equivalent to step 113 of method 100 of FIG. 4A. Following step 113, the wireline communication link has been replaced by the corresponding wireless communication link and method 140 proceeds to end 124 via USE WIRELESS COMM step 130 and path 133. In the same manner as discussed in connection with method 100 of FIG. 4A, method 140 may be repeated as often as is necessary to insure reliable communications by, but not limited to, optional path 137 looping back from END 124 to TEST WIRELESS COMMUNICATION LINK step 104.

In the preferred embodiment, method 100 or 140 is executed for drive-by-wire communication link equipped with wireless backups and, desirably, any other links used by the automobile control system. Method 100 or 140 may be executed substantially as a whole for each link before proceeding to the next link or may be executed a step at a time for each link or a combination thereof. For example, methods (100,140) may be executed as a whole for links (25,32) then re-executed as a whole for links (26,35) and then again for links (27,38) and so forth. Alternatively, steps (104,106) may be executed for links (25,32) then re-executed for links (26,35) and then again for links (27,38) before proceeding to subsequent steps for the same links. With the latter approach, any links discovered to be functioning or not functioning need to be noted before proceeding to the next steps so that this information is available as needed for subsequent steps relating to the same links. Persons of ordinary skill in the art will understand how to do this based on the description herein.

Figure 5:
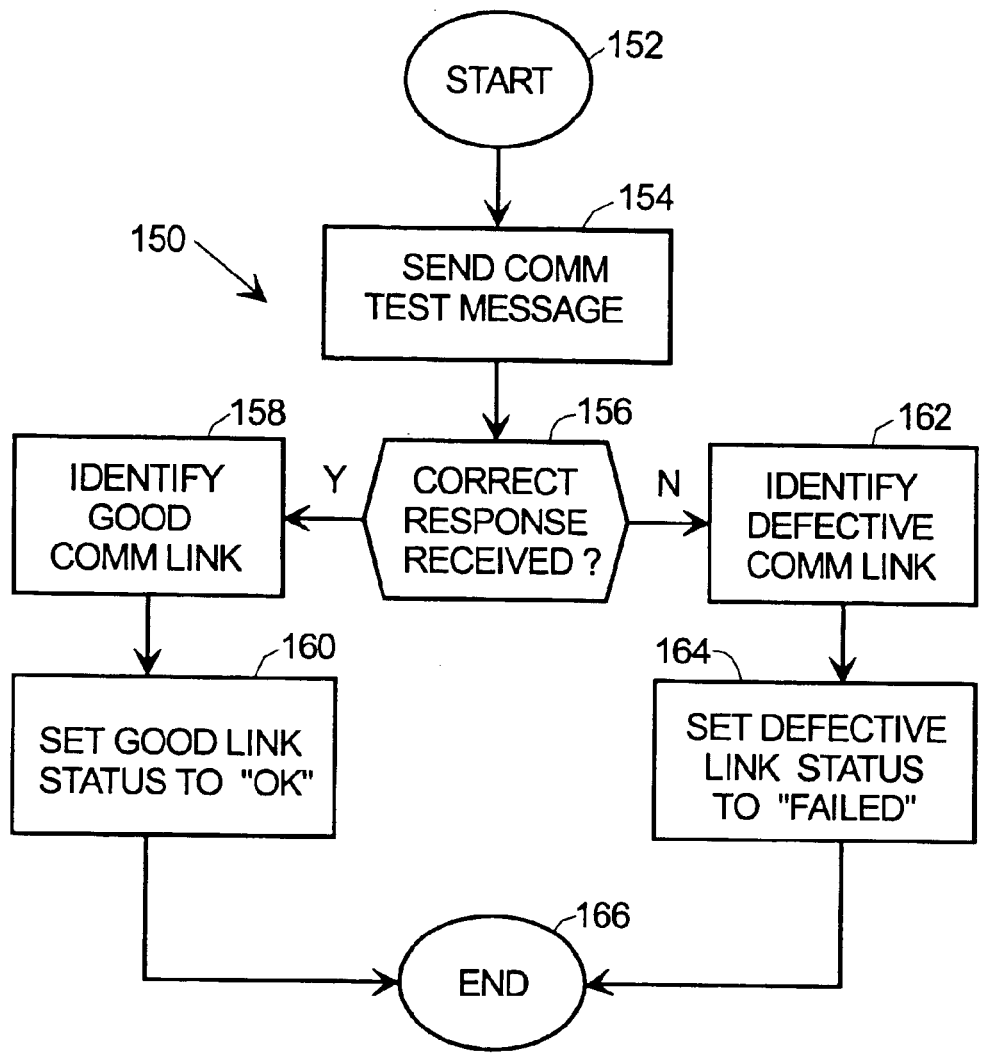
FIGS. 5–6 are simplified flow charts showing further details of the method of FIG. 4.
Figure 6:
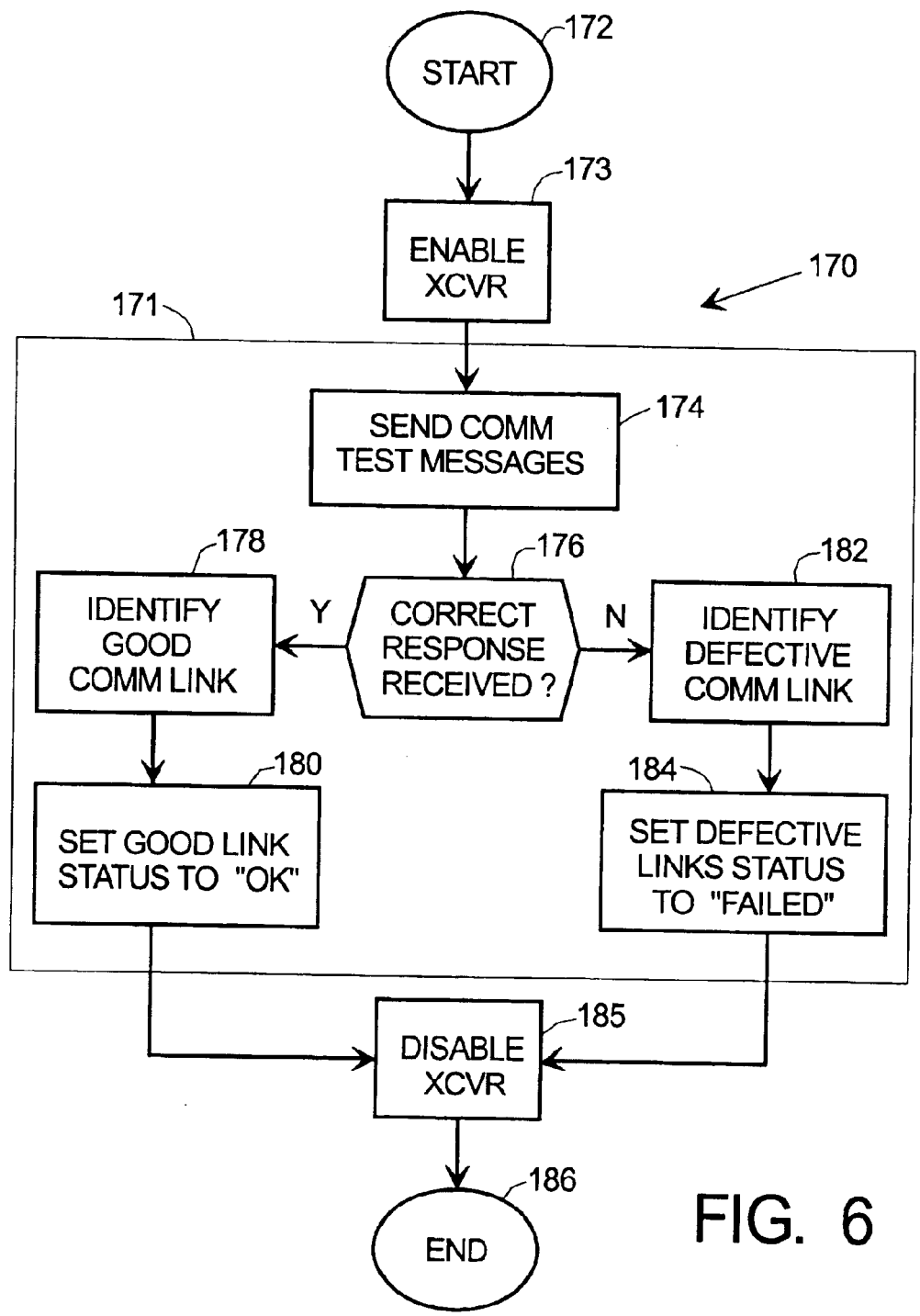

FIG. 5 and FIG. 6 are simplified flow charts showing further details of the methods (100,140) of FIG. 4A and FIG. 4B. FIG. 5 illustrates method 150 for testing of wireline communication links and FIG. 6 illustrates method 170 for the testing wireless communication links, to determine which are functioning correctly and which is not functioning properly (i.e., a failure condition). Referring now to FIG. 5, following start 152 that occurs at the beginning of any step in the previously described methods (100,140) and testing of a wireline communication link is desirable, SEND COMM TEST MESSAGE step 154 is carried out with a communication test message sent over the wireline communication link under evaluation. Resulting query 156 determines whether or not the correct response has been received from the communication link destination. For example in FIG. 1, control module 22 sends an inquiry, an electronic "Do you read me?" message across wireline communication link 25 to steering motor 28, which responds with a information related to reception and clarity of reception that indicates that wireline communication link 25 is functioning properly. If the outcome of query 156 is YES (e.g., TRUE), then in IDENTIFY GOOD COMM LINKS step 158 the identity of the wireline communication link being tested is determined and in SET GOOD LINK STATUS TO "OK" step 160 a flag or other notation is set in memory indicating that such communication link (e.g., link 25) is functioning properly. If the outcome of query 156 is NO (e.g., FALSE), then in IDENTIFY DEFECTIVE COMM LINKS step 162 the identity of the link being tested is determined and in SET DEFECTIVE LINK STATUS TO "FAILED" step 164 a flag or other notation is set in memory indicating that such communication link (e.g., link 25) is not functioning properly. Following steps 160 or 164, method 150 proceeds to end 166. Sub-routine 150 is desirably called whenever a wireline communication link needs to be tested.

Referring now to FIG. 6, following start 172, which preferably occurs at the beginning of any step in method 100 where a wireless communication link is to be tested, ENABLE XCVR(s) step 173 is executed to turn on the corresponding transceiver or transceiver pair. Following step 173, the method continues with the execution of steps 174, 176, 178, 180, 182, 184 within outline 171. Steps 174, 176, 178, 180, 182, 184 are equivalent, respectively, to steps 154, 156, 158, 160, 162, 164 of FIG. 5. SEND COMM TEST MESSAGE step 174 is carried out where a communication test message is sent over the wireless communication link under evaluation. Resulting query 176 determines whether or not the correct response has been received from the communication link destination. For example in FIG. 1, control module 22 sends an inquiry, an electronic "Do you read me?" message across wireless communication link 32 to steering motor 28 using XCVR pair (30,31). Steering motor responds with an electronic message of reception and clarity of reception that indicates that wireless communication link 32 is functioning properly. If the outcome of query 176 is YES (e.g., TRUE) then in IDENTIFY GOOD COMM LINKS step 178 the identity of the link being tested is determined and in SET GOOD LINK STATUS TO "OK" step 180 a flag or other notation is set in memory indicating that such communication link (e.g., link 32) is functioning properly. If the outcome of query 176 is NO (e.g., FALSE) then in IDENTIFY DEFECTIVE COMM LINKS step 182 the identity of the link being tested is determined and in SET DEFECTIVE LINK STATUS TO "FAILED" step 184 a flag or other notation is set in memory indicating that such communication link (e.g., link 32) is not functioning properly. Following steps 180 or 184, method 170 proceeds to DISABLE XCVR(s) step 185 and END 186.

Figure 7:
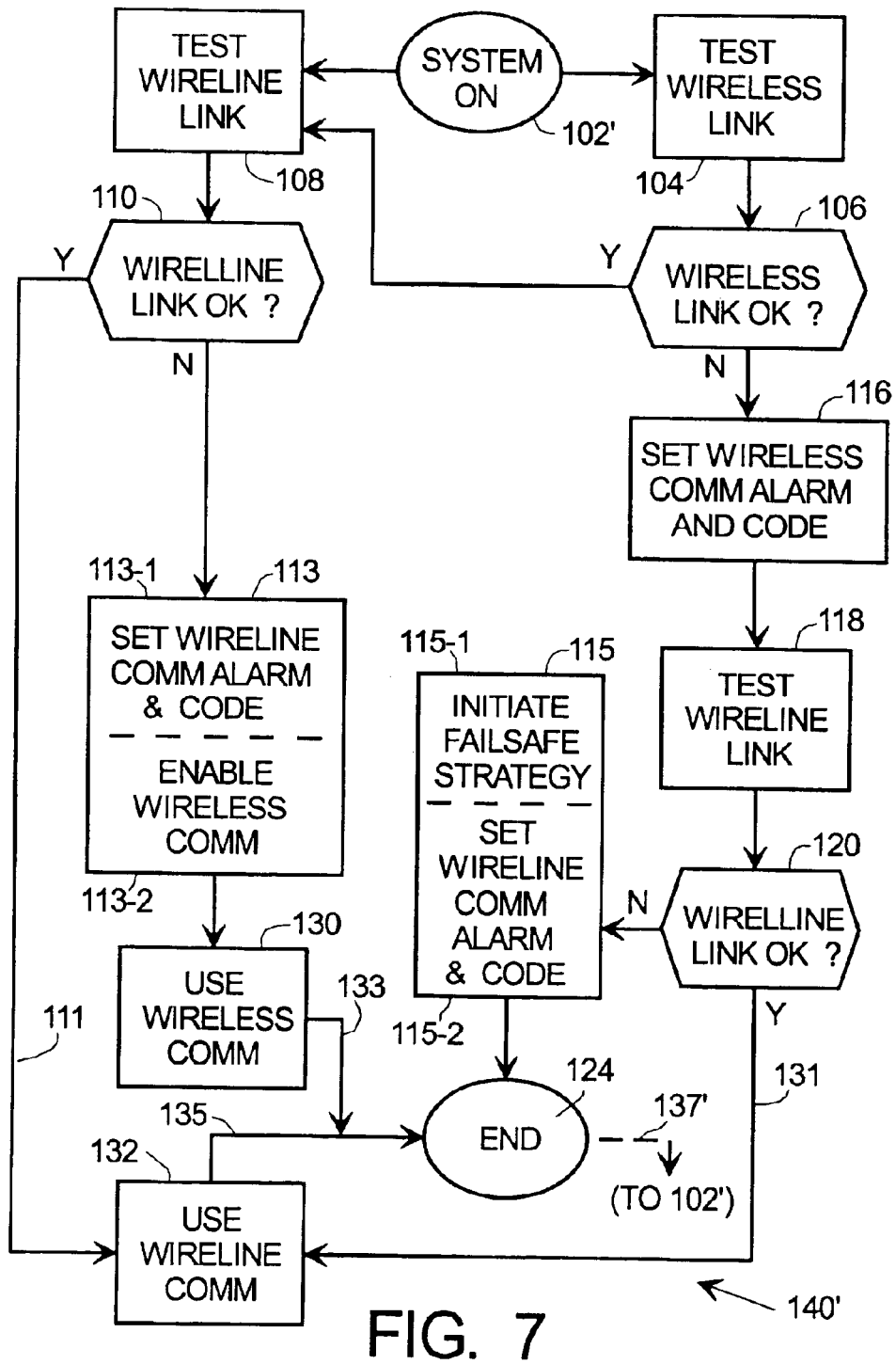
FIG. 7 is a simplified flow chart illustrating a method of operating an automobile drive-by-wire system in accordance with another exemplary embodiment.

FIG. 7 is a simplified flow chart illustrating method 140' according to a further exemplary embodiment of the present invention. For convenience of explanation, when steps in method 140' are substantially similar to those of methods 100 and 140 and like reference numbers are used in the discussion. Method 140' differs from the two previous methods (100,140) of FIG. 4A and FIG. 4B in that the initial wireline communication link and wireless communication link test steps are performed in parallel rather than in series. Following SYSTEM ON start 102', which is analogous to SYSTEM ON start 102, TEST WIRELINE COMMUNICATION LINK step 108 and TEST WIRELESS COMMUNICATION LINK step 104 are performed, leading respectively to WIRELINE COMMUNICATION LINK OK? query 110 and WIRELESS COMMUNICATION LINK OK? query 106. Following these queries (106,110), method 140' proceeds in substantially the same manner as method 140 of FIG. 4B.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicle drive-by-wire system, comprising:
   a sensor that is configured to generate an output indicative of a driver requested setting of a first drive-by-wire function;
   a function control module coupled to the sensor and providing an actuator command based at least in part on the output of the sensor;
   a wireline communication link coupled to the function control module and configured to receive and transmit the actuator command;
   a wireless communication link coupled to the function control module and configured to receive and transmit the actuator command;
   a communication control unit coupled to the wireline communication link and the wireless communication link, the communication control unit configured to identify a failure of the wireline communication link to transmit the actuator command and further configured to redirect transmission of the actuator command over the wireless communication link; and
   an actuator coupled to the wireline communication link and the wireless communication link, the actuator configured to receive the actuator command from the wireless communication link unless the failure of the wireless communication link to transmit the actuator command exists.

2. The vehicle drive-by-wire system of claim 1, wherein the communication control unit is configured to identify a failure of the wireless communication link to transmit the actuator command and further configured to implement a failsafe strategy if the failure of the wireline communication link and the failure of the wireless communication link exist.

3. The vehicle drive-by-wire system of claim 1, wherein the wireless communication link comprises radio transceivers exchanging electromagnetic signals.

4. The vehicle drive-by-wire system of claim 1, wherein the communication control unit is configured to identify the failure by a transmitting test signal over the wireline communication link and receiving a predetermined acknowledgement in response to the transmitting the test signal.

5. The vehicle drive-by-wire system of claim 1, further comprising parallel wireline and wireless communication links between the at least one sensor and the function control module.

6. The vehicle drive-by-wire system of claim 1, wherein the function control module is a zone control module controlling multiple actuators in a common zone.

7. A vehicle drive-by-wire system, comprising:
a vehicle feature unit configured to provide an output derived from a driver manipulation an input to the vehicle feature unit;
a functional control module coupled to the vehicle feature unit and configured to receive and translate the output into actuator instructions;
an actuator coupled to the functional control module and configured to respond to the actuator instructions;
a wireline communication link that is configured to couple the functional control module and the actuator;
a wireless communication link that is configured to couple the functional control module and the actuator; and
a communication control unit that is configured to test the wireline communication link and the wireless communication link, the communication control unit further configured to redirect communication between the functional control module and the actuator to the wireless communication link if the communication control unit detects a failure in the wireline communication link.

8. The vehicle drive-by-wire system of claim 7, wherein the communication control unit is configured to identify a failure of the wireless communication link to transmit the actuator command and further configured to implement a failsafe strategy if the failure of the wireline communication link and the failure of the wireless communication link exist.

9. The vehicle drive-by-wire system of claim 7, wherein the wireless communication link employs radio transceivers.

10. The vehicle drive-by-wire system of claim 7, comprising multiple actuators controlled over the wireline communication link and the wireless communication link by the functional control module.

11. The vehicle drive-by-wire system of claim 7, wherein the function control module is a zone control module controlling multiple actuators in a common zone.

12. A method of operating a vehicle drive-by-wire system, comprising the steps of:

generating an output indicative of a driver requested setting of a first drive-by-wire function;
providing an actuator command based at least in part on the output;
testing a wireline communication link that is configured to transmit the actuator command to an actuator; and
enabling a wireless communication link to transmit the actuator command to the actuator if said testing of the wireline communication link indicates a failure in the wireline communication link.

13. The method of operating the vehicle drive-by-wire system of claim 9, further comprising setting an alarm if said testing of the wireline communication link indicates the failure in the wireline communication link.

14. The method of operating the vehicle drive-by-wire system of claim 7, further comprising the steps of:
testing the wireless communication link; and
initiating a failsafe strategy if the testing the wireless communication link indicates a failure in the wireless communication link and the testing the wireline communication link indicates the failure in the wireline communication link.

15. An automobile drive-by-wire system, comprising:
a sensor that is configured to generate an output indicative of a driver requested setting of a drive-by-wire function;
a zone control module coupled to the sensor and providing an actuator command based at least in part on the output of the sensor, the zone control module controlling multiple actuators in a common zone;
a wireline communication link coupled to the zone control module and configured to receive and transmit the actuator command;
a wireless communication link coupled to the zone control module and configured to receive and transmit the actuator command;
a communication control unit coupled to the wireline communication link and the wireless communication link, the communication control unit configured to:
identify a failure of the wireline communication link to transmit the actuator command;
redirect transmission of the actuator command over the wireless communication link;
identify a failure of the wireless communication link to transmit the actuator command; and
implement a failsafe strategy if the failure of the wireline communication link and the failure of the wireless communication link exist.

16. The automobile drive-by-wire system of claim 15, wherein the common zone is the front of an automobile.

17. The automobile drive-by-wire system of claim 15, wherein the drive-by-wire function is braking of an automobile.

18. The automobile drive-by-wire system of claim 15, wherein the drive-by-wire function is steering of an automobile.

* * * * *